United States Patent [19]

Slocum et al.

[11] Patent Number: 5,674,032

[45] Date of Patent: Oct. 7, 1997

[54] TOOLING SYSTEM AND METHOD WITH INTEGRAL HYDROSTATIC BEARINGS AND TURBINE POWER SOURCE

[75] Inventors: Alexander H. Slocum, Bow; Kevin Wasson, Enfield, both of N.H.

[73] Assignee: AESOP, Inc., Concord, N.H.

[21] Appl. No.: 541,280

[22] Filed: Oct. 12, 1995

[51] Int. Cl.[6] .................................... B23B 35/00

[52] U.S. Cl. .................... 409/131; 408/1 R; 408/57; 408/124; 408/226; 408/702; 409/231

[58] Field of Search .................. 408/1 R, 56, 57, 408/124, 125, 226, 702; 409/131, 231, 135, 235

[56] References Cited

U.S. PATENT DOCUMENTS

| | | |
|---|---|---|
| 3,101,014 | 8/1963 | Rowe et al. ........................ 408/702 |
| 3,293,955 | 12/1966 | Malmgren ........................ 408/702 |
| 4,869,626 | 9/1989 | Kosmowski ........................ 409/231 |

FOREIGN PATENT DOCUMENTS

| | | | |
|---|---|---|---|
| 536434 | 7/1954 | Belgium ........................ 409/231 |
| 1041218 | 10/1953 | France ........................ 408/124 |
| 46-31268 | 4/1967 | Japan ........................ 408/702 |
| 114803 | 7/1983 | Japan ........................ 408/124 |

Primary Examiner—Daniel W. Howell
Attorney, Agent, or Firm—Rines and Rines

[57] ABSTRACT

An integrated tooling system and technique wherein the tool shaft serves as its own spindle and is provided on its surface with hydrostatic bearing grooves for permitting spinning within a supporting bore, and with the shaft connected at its rear end internally with a driving fluid turbine to form an in-line integrated high speed high power tooling system.

14 Claims, 4 Drawing Sheets

FIG. 3  AXIAL FLOW TURBOTOOL

| Parameter | Symbol | Value | | |
|---|---|---|---|---|
| FLUID DENSITY (kg/m^3) | $\rho$ | 997 | | |
| FLUID VISCOSITY (N m/s) | mu | 0.0013 | | |
| FLUID SPECIFIC HEAT CAPACITY (J/kgK) | $c_p$ | 4180 | | |
| SHAFT SPEED (RAD/S,RPM) | $\omega$ | 10472.0 | ##### | |
| SHAFT DIAMETER (m,mm,in) | D | 0.04 | 40 | 1.57 |
| TURBINE OUTER DIAMETER (m,mm,in) | Do | 0.047 | 47 | 1.85 |
| (FLOW AREA)/(TOTAL AVAILABLE FLOW AREA) | | 0.9 | | |
| TOTAL AXIAL FLOW AREA (m^2,mm^2,in^2) | A | 0.000430 | 430.5 | 0.67 |
| RATIO OF AXIAL VELOCITY TO TIP VELOCITY | $V_a/U_t$ | 0.2 | | |
| AXIAL VELOCITY (m/s,ft/s) | $V_a$ | 45.6 | 149.5 | |
| TURBINE TIP SPEED (m/s,ft/s) | $U_t$ | 227.8 | 747.3 | |
| FLOW RATE, Q (m^3/s, gpm, lpm) | Q | 0.0196 | 310.8 | 1176.6 |
| MASS FLOW RATE (kg/s) | $\rho Q$ | 19.55 | | |
| NOZZLE OUTLET ANGLE (RAD,DEGREES) | $\alpha_1$ | 0.8727 | 50 | |
| TURBINE INLET ANGLE (RAD,DEGREES) | $\beta_1$ | 0.2359 | 13.51 | |
| NO-SWIRL TURBINE OUTLET ANGLE (RAD,DEGREES) | $\beta_{2,ns}$ | 0.1974 | 11.31 | |
| TURBINE OUTLET ANGLE (RAD,DEGREES) | $\beta_2$ | 0.1994 | 11.42 | |
| TANGENTIAL SPEED FROM NOZZLE (m/s,ft/s) | $V_{t1}$ | 38.22 | 125.4 | |
| OVERALL SPEED FROM NOZZLE (m/s,ft/s) | $V_1$ | 59.47 | 195.1 | |
| TANGENTIAL SPEED FROM TURBINE (m/s,ft/s) | $V_{t2}$ | 2.32 | 7.6 | |
| OVERALL SPEED FROM TURBINE (m/s,ft/s) | $V_2$ | 45.61 | 149.6 | |
| OPTIMAL NO-LOSS POWER (W,kW,hp) | $P_{opt}$ | 170208.8 | 170.2 | 228.3 |
| ACTUAL NO-LOSS POWER (W,kW,hp) | P | 159899.8 | 159.9 | 214.4 |
| TURBINE EFFICIENCY | e | 0.8 | | |
| ACTUAL POWER (W,kW,hp) | P | 127920 | 127.9 | 171.5 |
| HEAD (W/(kg/s)) | h | 6543.0 | | |
| HEAD COEFFICIENT | $\Delta h/(\Delta \omega^2 D^2)$ | 0.032 | | |
| FLOW COEFFICIENT | $Q/(\omega D^3)$ | 0.0227 | | |
| SPECIFIC SPEED | $\omega Q^{1/2}/\Delta h^{3/4}$ | 2.02 | | |
| REQUIRED PRESSURE AT TURBINE EXIT (PSI) | $\rho V^2/2$ | 1255 | | |
| NO-LOSS TURBINE PRESSURE DROP (PSI) | $\Delta P_{NO-LOSS}$ | 1183 | | |
| ACTUAL TURBINE PRESSURE DROP (PSI) | $\Delta P$ | 1478 | | |
| REQUIRED TURBINE INLET PRESSURE (PSI) | | 2733 | | |
| PIPE LENGTH (m,ft) | $L_{pipe}$ | 30.5 | 100 | |
| PIPE DIAMETER (m,in) | $D_{pipe}$ | 0.0381 | 1.5 | |
| PIPE FLOW VELOCITY (m/s) | $V_{pipe}$ | 17.2 | | |
| PIPE FLOW REYNOLDS NUMBER | $Re_{pipe}$ | 502579 | | |
| PIPE PRESSURE DROP (PSID) | $\Delta P_{pipe}$ | 237 | | |
| TOTAL SPINDLE DRAG POWER (W,kW,hp) | | 21355 | 21.4 | 28.6 |
| OVERALL FLUID TEMPERATURE RISE (°C,°F) | | 1.8 | 3.3 | |
| RADIAL BEARING POWER CONSUMPTION | $D_{bear}$ | 0.025 | | |
| | $L_{bear}$ | 0.035 | | |
| | $h_{bear}$ | 1.00E-05 | | |
| | $V_{bear}$ | 130.9 | | |
| SINGLE BEARING POWER (W,kW,hp) | | 6123.2013 | 6.123 | 8.211 |
| THRUST FACE POWER CONSUMPTION | $D_i$ | 0.025 | | |
| | $D_o$ | 0.04 | | |
| | $D_{thrust}$ | 0.0333542 | | |
| | $h_{thrust}$ | 1.00E-05 | | |
| | $V_{thrust}$ | 174.6 | | |
| SINGLE THRUST FACE POWER (W,kW,hp) | | 3036 | 3.036 | 4.072 |

TOOLING SYSTEM AND METHOD WITH INTEGRAL HYDROSTATIC BEARINGS AND TURBINE POWER SOURCE

The present invention relates to rotating tools that operate at very high rotational speeds with very high available power to do work.

BACKGROUND

Conventional machine tools use rolling-element spindles that hold a high speed cutting tool in a tool holder attached to the spindle. In order to hold the tool with sufficient stiffness, the diameter of the spindle is usually several times the diameter of the tool. The spindle rotates in rolling-element bearings which give it radial and axial load capacity and is typically powered with an electric motor.

As spindle rotational speeds and powers increase, however, such as is needed for cutting aluminum and titanium, for example, the viscous drag on the bearings increases, which necessitates the use of bearings with fewer rolling elements. This, in turn, makes the spindle more subject to damage if the machine crashes into an object, which occurs more often at the high translational speeds at which machines often travel when performing, for example, operations such as high speed milling. Additionally or alternatively, the preload on the rolling elements can be decreased to reduce the power consumed by the bearings. This, however, reduces the stiffness of the bearings and results in greater tool displacements (and thus machining inaccuracies) during machining.

A fundamental issue is the need, before stated, for a spindle shaft that is several times larger than that of the tool shaft in order rigidly to hold the tool in the spindle. The penalty for using bearings of larger diameter, moreover, is high power losses and high heat generation since viscous power losses increase with the square of the bearing diameter and the number of rolling elements. Increasing the speed on rolling element bearings past a DN value of 2 million (where DN value equals speed in rpm times diameter in millimeters) is a daunting task with very limited return on investment. Driving spindles with power levels exceeding 50 kW using integral electric motors is also very discouraging because heat generation caused by motor inefficiencies results in substantial thermal errors. The cost of conventional high speed-high power rolling element spindles is also very high, on the order of $100,000.

Currently, therefore, spindles supported by pressurized air have been used to provide the capability to run at very high speeds. For an air bearing to be stable, however, it requires a very small radial bearing gap. Thus even air, which has 1/10th the viscosity of water, can generate significant viscous drag power losses at very high speeds. In addition, air can only be used safely at low presses, on the order of 200 psi, so the load capacity of high speed air bearing spindles is much less than those of rolling element spindles. Furthermore, because of the compressibility of air, these systems are very delicate, and any impact load on the spindle typically results in a crash which destroys the spindle, which is very costly.

Another type of prior spindle technology used for very high speeds involves magnetic bearings. Magnetic bearings can run with large 1 mm gaps and thus generate no shear power losses; however, electromagnets generate load-supporting pressures no higher than air bearings, and thus they are also very limited in the power that they can apply to the cutting tool. Also, as with rolling element and air bearings, if a magnetic bearing spindle crashes at very high speed, the energy in the shaft invariably causes the system to destroy itself.

Another type of bearing technology available involves the use of hydrostatic bearings. Because of power losses caused by viscous shearing, however, these bearings are typically never run at speed values of DN greater than 500,000 when oil is used as the pressurizing fluid. Thus a 50 mm diameter oil-hydrostatic spindle would never be run at more than 10,000 rpm. Though higher speeds can be obtained when water is used as the pressurizing fluid, because it has a lower viscosity than oil, even water-pressurized hydrostatic bearings have substantial shearing power losses at high speeds, particularly when large spindle diameters are used. For example, a 50 mm diameter water spindle would have about 60 kW of bearing losses at 50,000 RPM.

In order to maximize power density (hence decreasing losses) and increase tool rotation accuracy (necessary to prevent imbalance at very high speeds), the present invention takes an entirely different approach of eliminating the need for a separate spindle and separate tool holder by incorporating hydrostatic bearing features into the surface of the tool shaft. Furthermore, to drive the tool with very high operating power and eliminate coupling problems between a separate drive source (e.g. motor) and the spindle/tool, a turbine is incorporated into the shaft of the tool itself. When high pressure fluid, typically water, is applied to the system, the fluid drives the turbine causing it to spin at very high angular velocity with very high available power for tool action (e.g., cutting). In addition, the high pressure fluid also provides the capability for very high radial and axial hydrostatic bearing capacities.

For example, a 25 mm diameter tool constructed in accordance with the invention and supplied with 185 atm. of fluid pressure can generate 100 kW of power for cutting at 100,000 rpm, and the radial and axial bearings can each resist 8000 Newtons of force. The power losses in the system caused by viscous fluid shearing would be about 25 kW (total power generated by the turbine would be 125 kW). This is about equal to the losses in a conventional ball bearing milling spindle running at only 50,000 rpm. This major advancement in power and speed can increase manufacturing productivity by an order of magnitude over current state of the art rolling element ball bearing systems.

Furthermore, as disclosed herein, by placing hydrostatic bearings on the cutting tool shaft itself (thus eliminating the tool holder and the need for a relatively large diameter spindle) and spinning the tool shaft, it is now possible to design high speed (100,000 rpm) systems with reasonable power consumption (approx. 22 kW). The difficulties of coupling a large, high power motor to the small tool shaft are mitigated, as also disclosed herein, by eliminating the separate motor altogether, and instead, driving the tool with a water-turbine whose components are also integrated onto the tool shaft. Water turbines can provide much higher power densities than electric motors at high speeds, as that very high machining power is available (approx. 100 kW at 100,000 RPM). This power results in low temperature rises since the water flow rate is high. Also, by using hydrostatic pressures in the hundreds or even thousands of atmospheres, very high bearing load capacities can be readily obtained.

OBJECTS OF THE INVENTION

A principal object of this invention is to provide a new and improved tooling system and method that eliminates the above-described prior art difficulties and limitations through integrating the function of the cutting tool, the spindle shaft, the spindle bearings, and the power source into a single element sometimes referred to herein as the TurboTool™ system.

An additional object of the invention is to provide such a novel system in which the hydrostatic bearing features are formed directly on the tool surface, such that hydrostatic bearing compensation is formed on the tool shaft surface, and the bore in which the tool resides, can then be made from a wear-resistant material such as Zirconia and the like.

An additional object of the invention is to provide an axial, radial, or mixed flow turbine on the tool shaft, such that the tool is directly driven by the high pressure fluid source acting on the turbine elements.

Still a further object is to provide such a novel system in which the elements thereof are manufactured from materials that will enable the system to operate with high pressure water or cutting fluid.

An additional object of the invention is to incorporate in the tool system a radial feed hole in the tool, such that fluid exiting the system that is not suctioned off to the collection tank, feeds to the tool center, and then passes axially along the tool center to supply through-the-tool coolant.

Other and further objects will be explained hereinafter and are more particularly delineated in the appended claims.

SUMMARY

In summary, the invention, from one of its viewpoints, involves an integrated tooling system having, in combination, a tool-supporting bore within which axially is supported a tool shaft serving as its own spindle and having a front cutting end extending outside the bore; the surface of the shaft within the bore having grooves formed therein to provide hydrostatic bearing functions enabling the tool to serve as its own spinning element within the bore; and a fluid-driven turbine integrally incorporated at the rear end of the tool shaft for spinning the tool shaft.

The invention is concerned with a tool that is supported in a bore by hydrostatic bearings that act directly on the tool shaft so that the tool shaft itself is the spinning element; and the power to spin the tool so that it can do work, such as cutting in a machine tool, is provided by a radial, axial, or mixed flow turbine also made integral with the tool shaft, and where the hydrostatic bearings and the turbine are activated by a high pressure fluid source.

Preferred and best mode embodiments are hereinafter described.

DRAWINGS

The invention will now be described with reference to the accompanying drawing in which:

FIG. 3 shows the software design spreadsheet that is used to optimize the design of the bearings and the turbine as a system;

PREFERRED EMBODIMENT(S) OF THE INVENTION

Figure 1:
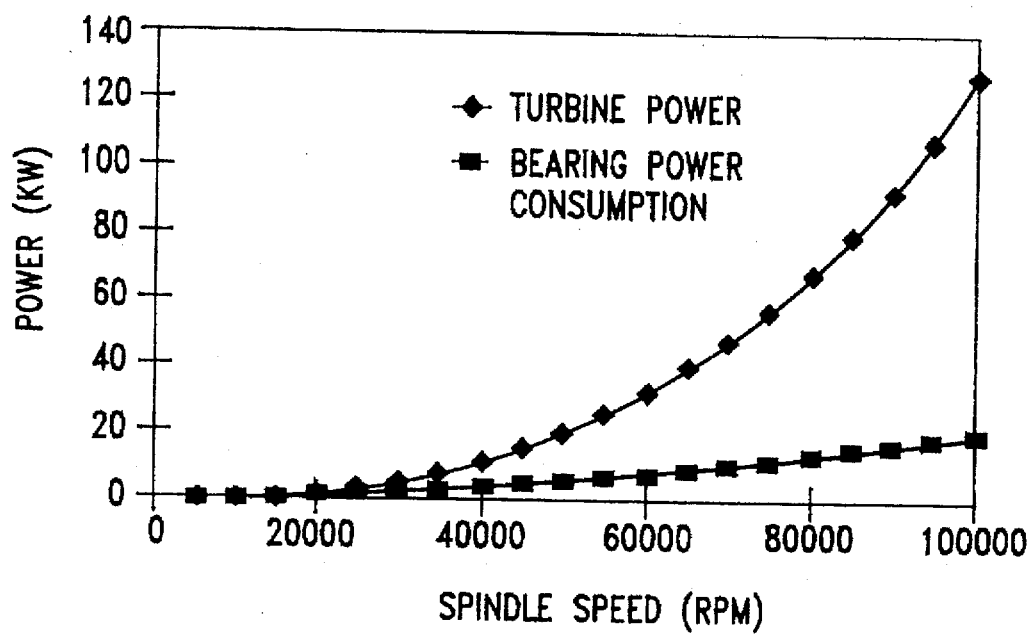
FIG. 1 is a plot of turbine power as a function of speed for an illustrative 47 mm OD×40 mm ID axial flow turbine, along with radial and axial hydrostatic bearing shear power losses for a 25 mm diameter tool shaft, that has been optimized for net power of about 100 kW.

In order for higher-cost societies to compete in manufacturing, they must have more advanced tools that can enable their high-paid machinists to produce parts faster than lower paid machinists. This can be accomplished in many ways using automation. However, when cutting parts that require a long time on the machine, such as large aircraft parts or the like, the answer is higher spindle speeds that will allow the machine tool to remove large amounts of metal or other materials an order of magnitude faster than is possible with conventional machines (which is what low-labor cost producers generally have available to them).

The critical goal, therefore, for manufacturers is to be able to obtain very high speeds for tools, using an economical and robust system. Existing designs for ceramic ball bearing or magnetic bearing high speed spindles, before discussed, are very expensive and very delicate, and thus do not provide what is really needed. This invention, in incorporating water hydrostatic bearings and water turbines, yields a very robust high speed system in which the unit mounted on the machine tool is actually fairly inexpensive. As a result, if there is a crash, little damage will be done.

To minimize cost and heat generated by a spindle system, and for other reasons before explained, the present invention uses the tool shaft itself as the spindle shaft. This eliminates the need for a tool holder, which is often a source of compliance and error motions as previously noted. The problem of how to get rotational power to the tool is solved through the driving of the tool with turbine blades that are also integrally formed on the tool shaft in accordance with the concepts of the invention. This eliminates the need for a very costly high speed motor and the associated precision bearings and drive electronics; and if the spindle is crashed into a work piece, it will not destroy an expensive piece of equipment.

The generic solution provided by the invention addresses these goals by providing a tool system wherein the tool is supported in a bore by hydrostatic bearings that act directly on the tool shaft so that the tool shaft itself is the spinning element; and by providing power to spin the tool so that it can do work, such as cutting in a machine tool, by an integral radial, axial, or mixed flow turbine, and wherein the hydrostatic bearings and the turbine are activated by a high pressure fluid source.

Before referring to the drawings illustrating preferred constructions of this nature, it is believed helpful first to consider the physics of the system.

When machining aluminum, for example, a general rule of thumb is that one needs 1 kW of power for every 1000 rpm of speed of a 25 mm diameter cutter. FIG. 1, as previously described, is a plot of turbine power as a function of speed for an illustrative 47 mm OD×40 mm ID axial flow turbine, along with radial and axial hydrostatic bearing shear power losses for an exemplary 25 mm diameter tool shaft. Note that turbines can generate power based on a speed-cubed law, and thus as the speed goes up, the power generated becomes very high. At 100,000 rpm, for example, the no-loss power generated can be 140 kW, which allows for 40 kW of losses and inefficiency. For this configuration, the pump pressure is 202 atm. (2970 psi) and the flow rate is 0.020 m$^3$/s (311 gpm). FIG. 3 shows the spreadsheet calculations used to design this particular illustrative system.

If the radial and axial bearings operate off of the same supply pressure, then even with a small diameter 25 mm tool shank, they will be able to support 8000N of force; which, as a radial load on a tool at such 100,000 rpm, represents 175 kW of power. Thus the bearings are well suited to support the machining forces, and the design is "well balanced".

Figure 2:
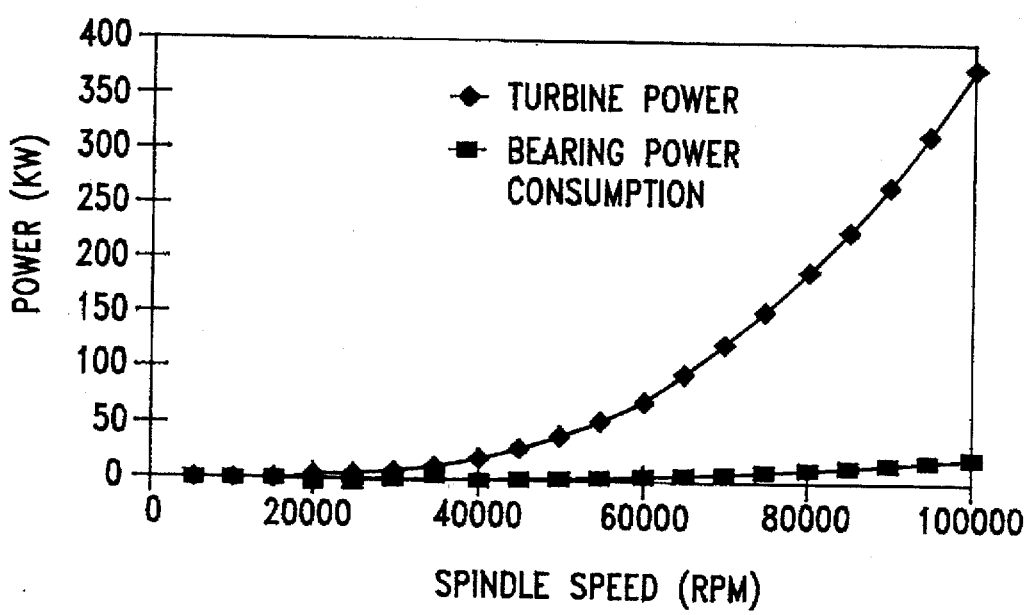
FIG. 2 is a plot of maximum turbine power that can be obtained as a function of speed for such a 47 mm OD×40 mm ID axial flow turbine, along with radial and axial hydrostatic bearing shear power losses for such an illustrative 25 mm diameter tool shaft.

FIG. 2, as earlier described, is a plot of maximum turbine power that can reasonably be obtained as a function of speed for the illustrative example of a 47 mm OD×40 mm ID axial flow turbine, along with radial and axial hydrostatic bearing shear power losses for the 25 mm diameter tool shaft. At 100,000 rpm, the power generated can be as much as 377 kW. For this configuration, designed using the spreadsheet shown in FIG. 3 (FIG. 3 is actually optimized for a lower power and flow turbine, but the form is the same), the pump pressure is 500 atm. (7350 psi) and the flow rate is 0.034 m$^3$/s (544 gpm).

The radial and axial bearing surfaces can be designed using the principles disclosed in co-pending U.S. patent applications Ser. Nos. 237,852 and 237,853, now U.S. Pat. No. 5,533,814 filed May 4, 1994. The bearing design formulas, when integrated with standard turbine design equations known to those skilled in the art of turbine design, can be optimized with a spreadsheet, such as in FIG. 3. The spreadsheet entries of FIG. 3 can be used to design an optimized balanced system, where the bearings have the capability to run off of the same supply as the turbine, and properly to resist the cutting loads.

Figure 4:
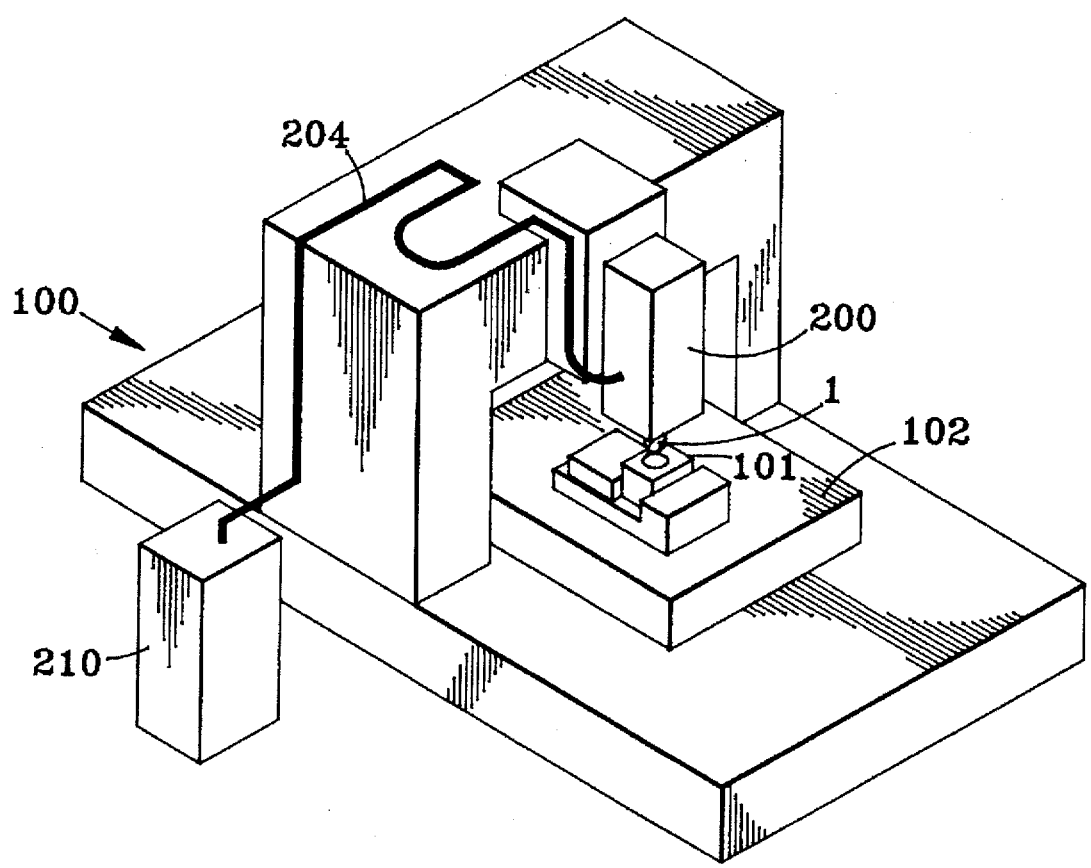
FIG. 4 shows a machine tool system with a TurboTool type spindle constructed in accordance with the present invention and powered by a high pressure pump.
Figure 5:
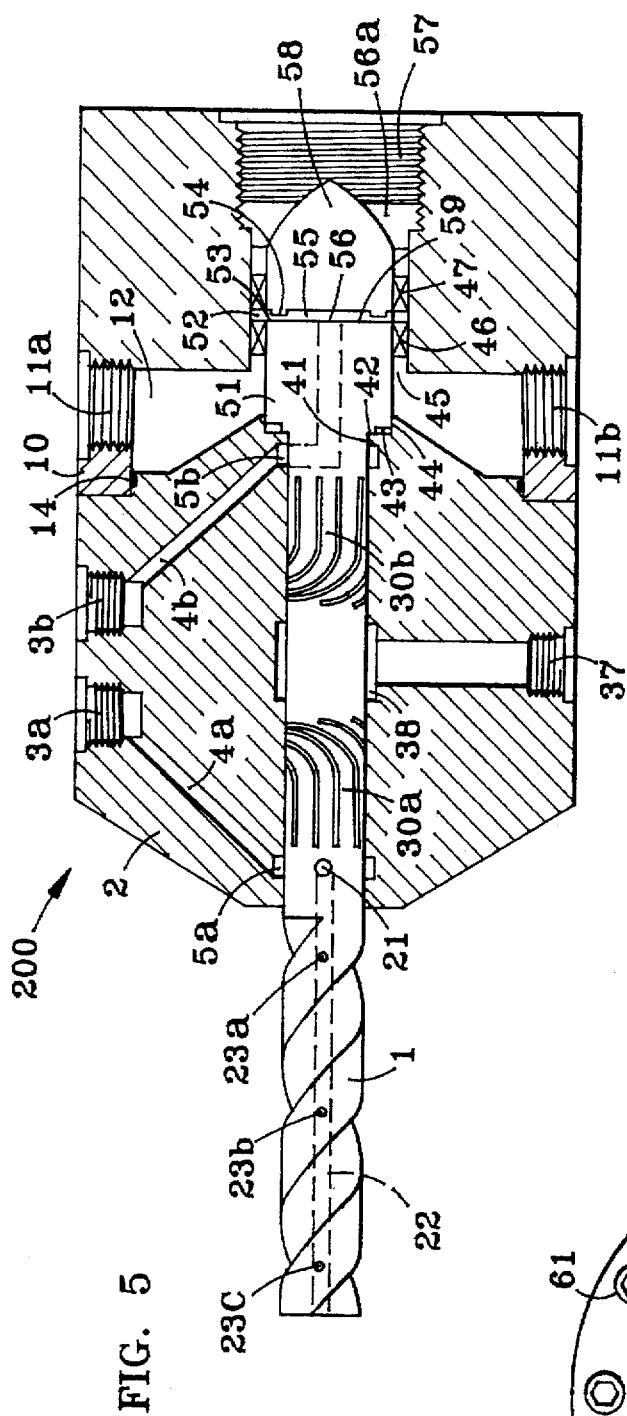
FIG. 5 shows a cross section through an axial flow type TurboTool system.
Figure 6:
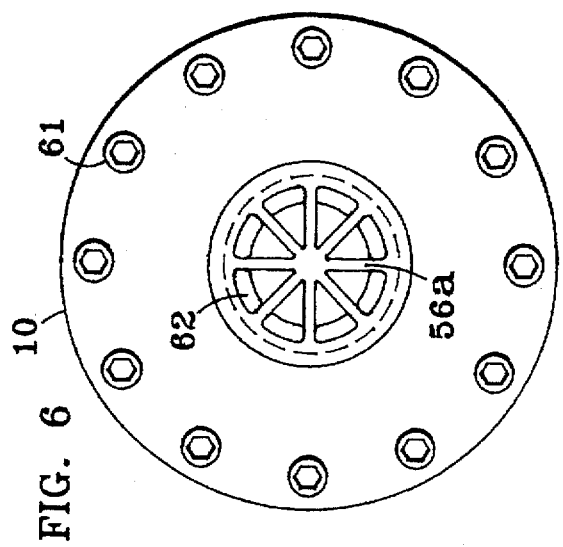
FIG. 6 shows an end view of the axial flow TurboTool system of FIG. 5.

A preferred integrated system so designed is system shown in FIGS. 4–6. In FIG. 4, a machining center 100 is shown with a bridge-type system for supporting Y and Z axes; but, of course, the system can be of any other machine tool form as well. The table 102 supports a part 101 which often will be as big as the table itself. For example, sections for aircraft are hogged out of solid billets of aluminum to minimize weight and maximize strength. The integral tool-bearings-turbine system 1 (called the TurboTool herein) is held in a housing system 200. A pressure supply/return line 204 has conduits within it: one or more supplying, for example, 185 atm. pressure to the system 200, and one or more bringing the exit flow back to the pressure supply-filter-cooling system 210.

FIG. 5 shows a cross section of an illustrative axial flow turbine TurboTool system of the invention. The tool 1 is located in a front housing 2, extending with its cutting end to the left beyond the tapered forward left-hand end of the bore, and its rear end connected to the later-described rear or right-hand end carrying the turbine drive housing 10. Hydrostatic bearing compensation features are formed directly into the shaft of tool 1 to form radial-groove hydrostatic bearings 30a and 30b. High pressure fluid to these bearings is supplied through a pressurized annulus 38 which is supplied through a high pressure port 37. Fluid from the bearings drains through annuli 5a and 5b which are connected to drain ports 3a and 3b through angularly formed holes 4a and 4b. This arrangement gives the tool high load capability and it is more rigid than holding a tool in a clamp-type tool holder commonly used in ball-bearing spindle systems. Water hydrostatic bearings having self-compensatory features are described by U.S. Pat. Nos. 5,281,032 and 5,104,237 of common assignee herewith.

Note that in high speed milling, it is not possible to effectively supply coolant to the tool because there are no high speed couplings available for through-the-tool coolant delivery. Furthermore, the high tool speed creates a powerful vortex around the tool which prevents coolant from being eternally jetted to the cutting zone. To address this problem, coolant can enter the tool through a radial hole 21 in line with the front drainage groove 5a. The coolant will then travel axially along the tool through hole 22 and it can exit the tool at the cutting surface via holes such as 23a, 23b, and 23c. If desired, a longer tool can be used, and the entrance hole 21 can be displaced from the drain groove 5a, so that coolant flow to the tool can be controlled with a separate valve system.

The turbine system is contained in the rear housing 10 which is seated onto the front housing 2 and sealed with an O ring 14. As shown in FIG. 6, bolts 61 clamp the system together. As shown in FIG. 5, the main pressure supply inlet 57 for the turbine and the thrust bearing is in the back of rear housing 10, in-line with the tool. In the end-view of FIG. 6, a plurality of radial support fins 56a are shown (here shown as eight fins) that support the central core 58. The rounded supply tunnels 62 allow the high pressure high flow fluid to flow freely and be web-diffused when it comes to the stationary inlet turbine blades 47 (shown here as an "X", as is customary with those skilled in the art when drawing turbine blades). These stationary blades 47, as known to those skilled in the art, take the axially flowing fluid and redirect it in a circumferential direction, thereby imparting angular momentum to the fluid. The fluid crosses the gap 52 to contact the rotating turbine blades 46 that, in accordance with the invention, are integral with the shaft of tool 1 and in this design are machined directly onto the OD of the thrust bearing cylinder 51. The turbine blades 46 are angled to receive the now swirling fluid and essentially extract the angular momentum from the flow, thereby causing the tool 1 to turn with high speed and great power, as is in the art of water turbine design. The fluid exits the turbine blades 46 and flows freely through the circumferential annulus 45 and then flows radially into the large circumferential collection chamber 12. Here the fluid exits via drains 11a and 11b in the rear housing 10.

The spreadsheet of FIG. 3 indicates the need to maintain a high static pressure across the turbine blades to prevent cavitation. The pressure is high enough at the outlet of the turbine to prevent cavitation and to force the water back though a modestly sized hose (about 40 mm for this illustrative 25 mm diameter tool) to the supply system 210 of FIG. 4. The hose bundle 204 for the 100,000 rpm, 100 kW net power system shown here may consist of an approximately 40 mm high pressure (200 atm.) diameter supply line, and three approximately 40 mm medium pressure (100 atm.) diameter return lines.

In order to provide thrust bearing capability to the system, some of the inlet flow from the inlet diffuser 62 can flow across the small gap 53 between the circumferential land 4 and the end of the tool shaft 59. This small gap may be on the order of 10–15 micrometers. The fluid enters a central drain pocket 55 and then flows axially through the tool via hole 56 to drain groove 5b, where it is collected and returned to the main system. The other side of the thrust bearing, which resists pull-out forces on the tool 1 and acts to preload the rear thrust bearing 54, is formed with an inlet resistance 44 formed by a radial gap on the order of 10 micrometers between the bore in the front housing 2. The fluid flows axially in this radial gap to enter the thrust bearing pocket 43. Resistance to fluid flow to exit the trust pocket is provided by axial land 42 and radial land 41, both of which may be on the order of 10 micrometers. The relative diameters of the thrust bearing faces must be sized to resist cutting thrust loads, and thrust loads generated by differential pressure across the turbine. This type of thrust bearing is of the type described in U.S. patent application Ser. No. 237,853, before referenced. Of course there are many other types of thrust bearing compensation system that can be used.

When comparing this technology technique of the invention to existing machine tool spindle designs, integral electric motor spindles also add substantial heat to the spindle shaft due to motor inefficiencies, resulting in unwanted temperature rise and thermal errors. The turbine drive delivers a much higher power density; and because the flow rate is high, the temperature rise of the driving fluid is minimal.

There are many different types of turbines, such as radial flow and mixed radial/axial flow, and there are many other types of hydrostatic bearings, such as diaphragm compensated and orifice compensated. These different elements could also be combined to make an integral tool-spindle-drive system as disclosed above. The system disclosed above is believed to have high efficiency and manufacturability and thus is represented here. Other systems, however, could also be designed and built that use the essence of this idea to combine bearing and turbine functions onto the shaft of the tool itself, and are thus considered to be within the scope of this invention. Further modifications of the invention will also occur to persons skilled in the art, and all such are deemed to fall within the spirit and scope of the invention as defined by the appended claims.

What is claimed is:

1. An integrated tooling system having, in combination, a tool-supporting bore within which axially is supported a tool shaft serving as its own spindle and having a front cutting end extending outside the bore; the surface of the shaft within the bore having grooves formed therein to provide hydrostatic bearing functions enabling the tool to serve as its own spinning element within the bore; and a fluid-driven turbine integrally incorporated at the rear end of the tool shaft for spinning the tool shaft.

2. An integrated tooling system as claimed in claim 1 and in which there is provided a source of high pressure fluid and means for connecting the source both to drive the turbine to spin the tool shaft, and to supply fluid for the hydrostatic bearing operation.

3. An integrated tooling system as claimed in claim 1 and in which the hydrostatic bearing grooves are radially and axially displaced along the shaft and there are further provided annuli and drain ports for receiving the fluid from the bearing grooves.

4. An integrated tooling system as claimed in claim 3 and in which there is provided means for injecting coolant along the tool shaft during the spinning, with the spinning producing a vortex to prevent the coolant from being externally jetted to the cutting end.

5. An integrated tooling system as claimed in claim 2 and in which the bore supports the shaft between a tapered forward end and a rearward end connected to a housing containing the turbine.

6. An integrated tooling system as claimed in claim 5 and in which an inlet for connection to a source of high-pressure fluid is provided in-line at the end of the turbine housing.

7. An integrated tooling system as claimed in claim 3 and in which the shaft grooves provide hydrostatic bearing thrust compensation.

8. An integrated tooling system as claimed in claim 5 and in which the turbine provides one of axial, radial and mixed fluid flow to drive the tool shaft.

9. An integrated tooling system as claimed in claim 8 and in which the fluid is one of water and cutting fluid.

10. An integrated tooling system as claimed in claim 4 and in which them is provided a radial feed hole in the tool for introducing the coolant fluid to the tool center.

11. An integrated tooling system as claimed in claim 1 and in which the bore is made from a wear-resistant material.

12. A method of providing high velocity and high power tool operation, that comprises, hydrostatically rotatably supporting a tool shaft having cutting and driving ends, and serving as its own integral spindle, along an axial bore; providing fluid-flow grooves in the tool shaft to enable fluid bearing operation during spinning of the shaft within the bore; and providing turbine fluid flow generation integrally with and at the driving end of the shaft to spin drive the same; and providing high pressure fluid to enable the turbine fluid flow and to provide bearing fluid.

13. A method as claimed in claim 12 and in which coolant fluid is introduced to the tool shaft within the bore during the spinning, with the spinning producing a vortex to prevent the coolant from being externally jetted to the cutting end.

14. An integrated tooling system as claimed in claim 11 and in which the wear-resistant material is Zirconia.

\* \* \* \* \*